US011834266B2

(12) United States Patent
Goyal et al.

(10) Patent No.: US 11,834,266 B2
(45) Date of Patent: Dec. 5, 2023

(54) CONTAINER LOADING OPTIMIZATION FOR HOLLOW CIRCULAR PIPES

(71) Applicant: SAP SE, Walldorf (DE)

(72) Inventors: Manish Goyal, Jalna (IN); Srinivasan Ramanathan, Chennai (IN)

(73) Assignee: SAP SE, Walldorf (DE)

( * ) Notice: Subject to any disclaimer, the term of this patent is extended or adjusted under 35 U.S.C. 154(b) by 1027 days.

(21) Appl. No.: 16/712,741

(22) Filed: Dec. 12, 2019

(65) Prior Publication Data

US 2021/0179350 A1 Jun. 17, 2021

(51) Int. Cl.
*B65G 1/04* (2006.01)
*G06Q 10/0832* (2023.01)
*B65G 57/11* (2006.01)
*B65G 67/02* (2006.01)

(52) U.S. Cl.
CPC ............... *B65G 1/04* (2013.01); *B65G 57/11* (2013.01); *B65G 67/02* (2013.01); *G06Q 10/0832* (2013.01); *B65G 2201/0276* (2013.01)

(58) Field of Classification Search
CPC .... B65G 57/165; B65G 57/18; B65G 57/186; B65G 57/20; B65G 2201/0276; B65G 1/04; B65G 67/12; B65G 57/16; G06Q 10/04; G06Q 10/083; G06Q 10/0832
See application file for complete search history.

(56) References Cited

U.S. PATENT DOCUMENTS

| 5,769,601 | A | * | 6/1998 | Agne | B65G 57/18 |
| | | | | | 414/789.5 |
| 10,740,862 | B1 | * | 8/2020 | Cui | G06Q 50/28 |
| 11,216,774 | B2 | * | 1/2022 | Powers | G06Q 10/08345 |
| 11,407,598 | B2 | * | 8/2022 | Winkler | B65B 35/50 |
| 11,531,954 | B2 | * | 12/2022 | Kumar | G06Q 10/0832 |
| 11,688,028 | B2 | * | 6/2023 | Cui | G06F 30/17 |
| | | | | | 703/6 |
| 2018/0374046 | A1 | * | 12/2018 | Powers | G06Q 10/08345 |
| 2022/0122031 | A1 | * | 4/2022 | Powers | B65G 1/1373 |

* cited by examiner

*Primary Examiner* — Patrick H Mackey
(74) *Attorney, Agent, or Firm* — Klarquist Sparkman, LLP

(57) ABSTRACT

Technologies are described for determining a loading arrangement for hollow circular pipes. Determining the loading arrangement can comprise determining an optimal telescopic arrangement for a plurality of hollow circular pipes. Determining the optimal telescopic arrangement can comprise determining a concentric telescopic arrangement and determining a radial telescopic arrangement. Groups of hollow circular pipes can be generated based on the concentric telescopic arrangement and the radial telescopic arrangement that specifies which of the hollow circular pipes will be arranged within each other concentrically and which of the hollow circular pipes will be arranged within each other radially. The loading arrangement can be determined that includes the optimal telescopic arrangement. The loading arrangement can also indicate how the groups of hollow circular pipes will be loaded into a container for shipment.

20 Claims, 6 Drawing Sheets

Figure 1
Hollow circular pipes 110
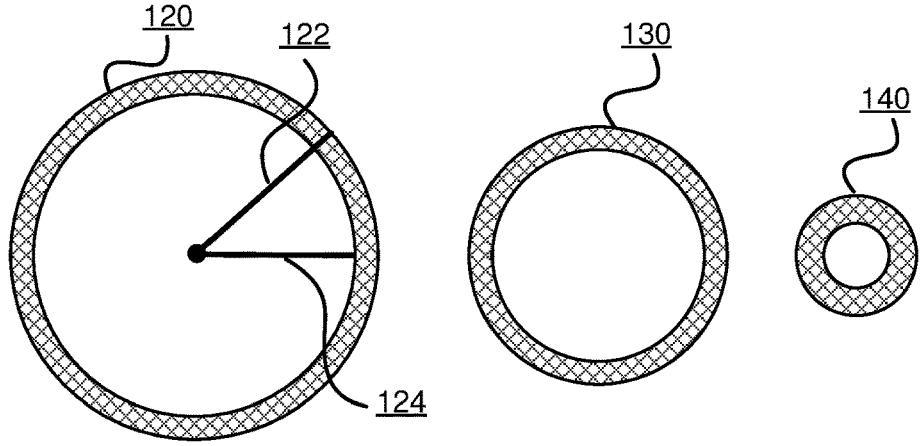
Concentric telescopic arrangement 150
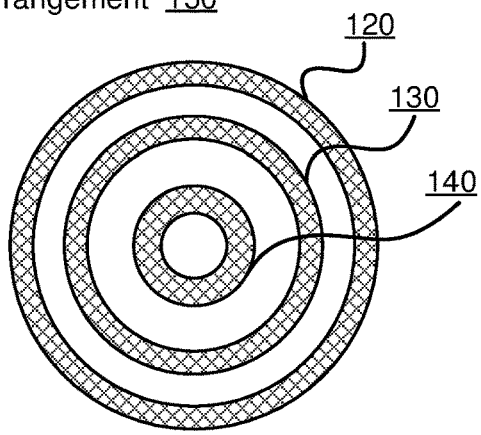
Radial telescopic arrangements 160
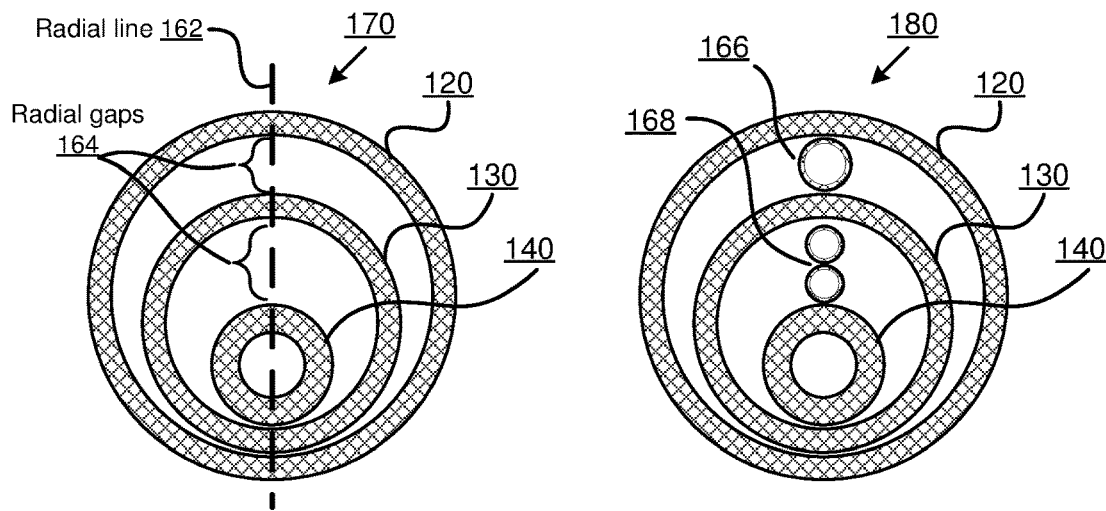

Loading Arrangement

Order details 310

| Product ID | Quantity |
|---|---|
| A | 150 |
| B | 250 |
| C | 75 |
| D | 500 |

Container utilization 320

Space utilized: 79.3%
Weight utilized: 19,386 lbs (container maximum 20,000 lbs)

Telescopic arrangement of groups 330

| Group ID | Quantity |
|---|---|
| [A, B, D] | 150 |
| [B] | 100 |
| [C, D] | 75 |
| [D] | 275 |

Stacking arrangement 340

CONTAINER LOADING OPTIMIZATION FOR HOLLOW CIRCULAR PIPES

BACKGROUND

The process of ordering pipe products begins when a customer (e.g., a dealer or customer) places an order for pipes (e.g., from a manufacturer or warehouse). The pipes are then loaded into a truck (or other type of container) for delivery to the customer. The shipping costs for delivering the pipe order to the customer can be a significant expense. For this reason, the customer wants the order to be shipped as efficiently as possible.

In some situations, pipe shipments can be inefficient. For example, the customer may order quantities of various pipe products without realizing that the order will not fit into one truck. For example, a first truck could be full and carry most of the shipment, while a second truck may be almost empty. As another example, a truck that is loaded with pipe product that are arranged as individual pipes may be full in terms of space, but may have extra capacity in terms of weight. For example, if space is fully utilized but the weight threshold has not been reached, then additional pipe products cannot be added.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various technologies are described herein for the automated determination of a loading arrangement of hollow circular pipes in a container. Operations for performing the automated determination can include receiving an indication of a plurality of hollow circular pipes, determining an optimal telescopic arrangement for the plurality of hollow circular pipes, determining the loading arrangement for the container where the loading arrangement comprises the optimal telescopic arrangement, and outputting an indication of the loading arrangement. Determining the optimal telescopic arrangement for the plurality of hollow circular pipes can comprise determining a concentric telescopic arrangement, determining a radial telescopic arrangement, and generating groups of the hollow circular pipes according to the concentric telescopic arrangement and the radial telescopic arrangement, where the groups specify which of the hollow circular pipes will be arranged within each other concentrically and which of the hollow circular pipes will be arranged within each other radially, and where the groups define the optimal telescopic arrangement.

In addition, operations for performing the automated determination of an optimal telescopic arrangement of hollow circular pipes for loading into a container can comprise receiving an indication of a plurality of hollow circular pipes, determining an optimal telescopic arrangement for the plurality of hollow circular pipes, and outputting results of loading the container according to the optimal telescopic arrangement. Determining the optimal telescopic arrangement can comprise determining a concentric telescopic arrangement that includes arranging pipes within pipes concentrically based at least in part on largest internal radius, determining a radial telescopic arrangement using the concentric telescopic arrangement, where determining the radial telescopic arrangement is based at least in part on radial gaps within the concentric telescopic arrangement, and generating groups of the hollow circular pipes according to the concentric telescopic arrangement and the radial telescopic arrangement, where the groups specify which of the hollow circular pipes will be arranged within each other concentrically and which of the hollow circular pipes will be arranged within each other radially, and where the groups define the optimal telescopic arrangement.

BRIEF DESCRIPTION OF THE DRAWINGS

FIG. 1 is a diagram depicting example telescopic arrangements of hollow circular pipes.

DETAILED DESCRIPTION

Overview

Figure 2:
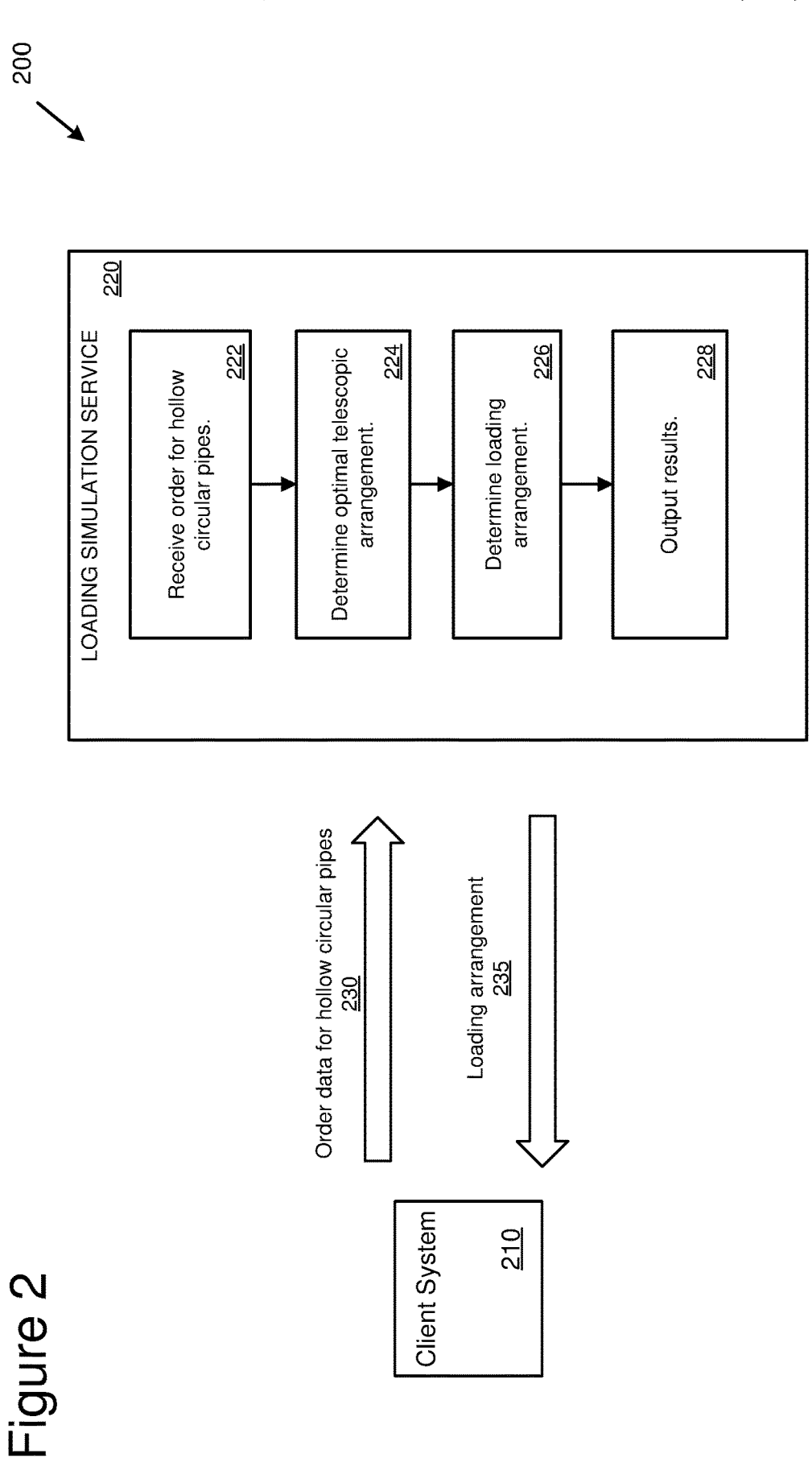
FIG. 2 is a diagram depicting an example environment for determining optimal telescopic arrangements of hollow circular pipes.

The following description is directed to technologies for determining a loading arrangement for hollow circular pipes. The loading arrangement can be determined when the hollow circular pipes are being ordered for shipment in a container (e.g., a truck, shipping container, railroad car, or other type of container in which product is shipped or otherwise delivered to the customer). Determining the loading arrangement can comprise determining an optimal telescopic arrangement for a plurality of hollow circular pipes. Determining the optimal telescopic arrangement can comprise determining a concentric telescopic arrangement and determining a radial telescopic arrangement. Groups of hollow circular pipes can be generated based on the concentric telescopic arrangement and the radial telescopic arrangement, where the groups specify which of the hollow circular pipes will be arranged within each other concentrically and which of the hollow circular pipes will be arranged within each other radially. The loading arrangement can be determined that includes the optimal telescopic arrangement (e.g., specifying the groups of hollow circular pipes). The loading arrangement can also indicate how the groups of hollow circular pipes will be loaded into a container for shipment (e.g., a stacking arrangement). The loading arrangement can be output (e.g., displayed to the user placing the order and/or provided to a shipment center for loading the groups of pipes).

For example, the technologies can be applied when a user is placing an order for pipe products. When the user creates an order, the order can be automatically processed in real-time and a loading arrangement can be presented to the user indicating various attributes of the order. For example, the loading arrangement can indicate one or more of the following: an optimal telescopic arrangement (e.g., a listing of the groups of the optimal telescopic arrangement indicating which pipes are arranged concentrically and/or which pipes are arranged radially), space and/or weight information (e.g., indicating how full the container would be with the pipes arranged according in the optimal telescopic arrangement and/or indicating how much of the maximum weight capacity of the container would be used by the pipes), or a graphical depiction of a stacking arrangement depicting how the groups can be stacked within the container.

In previous solutions, placing an order for pipe products and loading the order onto a container was a manual process. For example, the customer would create the order without regard to how full the truck would be in terms of space or weight. Similarly, a person would load the truck with the pipe products manually, without knowing whether the loading was optimal in terms of space and/or weight.

The technologies described herein provide advantages over previous solutions. For example, the technologies can be applied to automatically determine a loading arrangement for an order of pipe products. Determining the loading arrangement can comprise determining an optimal telescopic arrangement. Using the optimal telescopic arrangement, the order can be evaluated (e.g., a loading simulation can be performed). For example, the user placing the order can be presented with results indicating how full the container would be for the order (e.g., with alerts presented if the order would exceed the weight and/or space capacity of the desired number of trucks). This allows the user to adjust their order accordingly (e.g., so that their order will fit within a desired number of trucks without going over the space and weight limitations, which saves time and money).

Hollow Circular Pipes

In the technologies described herein, loading arrangements for hollow circular pipes (also referred to as pipes) are determined. The technologies can be applied to any type of hollow circular pipes (e.g., any material composition). For example, hollow circular pipes can be plastic pipes (e.g., PVC pipes). Hollow circular pipes can also be metal pipes (e.g., copper pipes, steel pipes, etc.).

Hollow circular pipes can be defined by their properties (e.g., the dimensions of the pipe as well as other properties, such as unique product identifiers). In some implementations, the properties of hollow circular pipes include: external radius, internal radius (which also indicates the thickness), length, weight (e.g., weight per unit of length), and unique product identifier.

Telescopic Arrangements

In the technologies described herein, hollow circular pipes are telescopically arranged within each other. A telescopic arrangement occurs when at least a first pipe is inserted into a second pipe. For example, the first pipe could be a 10 foot long pipe with an external radius of 6 inches and the second pipe could be a 10 foot long pipe with an internal radius of 8 inches and an external radius of 9 inches. Telescopically arranging the first pipe within the second pipe creates a group, with the group being 10 feet long with an external radius of 9 inches. A group can have a number of pipes (e.g., 2 or more pipes) telescopically arranged within each other.

FIG. 1 depicts example telescopic arrangements of hollow circular pipes. In FIG. 1, three example hollow circular pipes 110 are depicted, a first pipe 120, a second pipe 130, and a third pipe 140, to illustrate how hollow circular pipes can be arranged telescopically. The three hollow circular pipes 110 are depicted as viewed from an end, and the lengths of the pipes are not depicted. The first pipe 120 is the largest in terms of outside (external) diameter, with the second pipe 130 being smaller, and the third pipe 140 being the smallest of the three.

The width of the hollow circular pipes can be defined in terms of radius or diameter. For example, the external radius of the first pipe 120 is depicted at 122 and the internal radius of the first pipe 120 is depicted at 124. The difference between the external radius and the internal radius is the thickness of the pipe wall (depicted by the crosshatch shaded area). Depending on the implementation, combinations of internal and/or external radius can be used to define the width of the pipe, and various combinations can be used interchangeably so long as the dimensions of the pipe can be determined. For example, pipes can be defined by external diameter and thickness, from which internal diameter (or internal radius) can be calculated. Similarly, dimensions can be in terms of radius and/or diameter, and converted between one another as needed.

In some implementations, hollow circular pipes are arranged within each other in a concentric manner A concentric telescopic arrangement occurs when pipes are inserted into each other in a particular sequence with a second pipe inserted into the center of a first pipe, a third pipe inserted into the center of the second pipe, a fourth pipe inserted into the center of the third pipe, and so on. When viewed from an end, the group of telescopically arranged pipes will appear as a number of concentric circles.

FIG. 1 depicts an example concentric telescopic arrangement 150 of the three example hollow circular pipes 110. In the example concentric telescopic arrangement 150, the second pipe 130 has been inserted into the first pipe 120, and the third pipe 140 has been inserted into the second pipe 130. The example concentric telescopic arrangement 150 is illustrated with the three pipes having the same center point.

In some implementations, determining the concentric telescopic arrangement for a collection of hollow circular pipes (e.g., from an order placed by a customer) is performed using a concentric telescopic arrangement algorithm that iteratively creates groups by first identifying a pipe with a largest internal radius and a pipe with a largest external radius that fits within the pipe with the largest internal radius. This algorithm iterates, creating larger and larger groups (i.e., groups with a larger number of pipes) until no more groups can be created given the limitations of the dimensions of the pipes and groups. In some implementations, the following operations are performed for determining the concentric telescopic arrangement for a collection of hollow circular pipes.

1. The algorithm first identifies Group A with largest internal radius. Initially, each pipe produce will be in a group with just the single pipe product (e.g., initially, Group A will have a quantity of Pipe A).
2. Then a Group B with largest external radius which can fit within Group A is identified.
3. Correspondingly, Group [A, B] is formed. Quantities of Group [A, B] are determined (e.g., the maximum quantity possible). The remaining quantities of Group A and Group B are updated accordingly.
4. This algorithm is then iteratively repeated for all the groups available until no further groupings are possible. At each iteration, preference is given to the group containing the most members (e.g., Group [A, B, C] will be selected over Group [D, E]) to minimize the total number of groups.

5. Remaining pipes are also marked as groups which consist only one pipe.

The concentric telescopic arrangement generated by the concentric telescopic arrangement algorithm is optimal because no further concentric groupings can be created.

In some implementations, hollow circular pipes are arranged within each other in a radial manner A radial telescopic arrangement occurs when a pipe (or a group of pipes) is inserted into a radial gap between the outer diameter of a first pipe and the inner diameter of a second pipe, where the second pipe is arranged within the first pipe. In some implementations, determining an optimal telescopic arrangement involves a first phase where an optimal concentric telescopic arrangement is determined and a second phase where an optimal radial arrangement is determined starting from the optimal concentric telescopic arrangement.

FIG. 1 depicts an example radial telescopic arrangement 160 that begins with the three example hollow circular pipes, as depicted at 170. As depicted in the example at 170, the three pipes (the first pipe 120, the second pipe 130, and the third pipe 140) are arranged as they would appear if they are lying horizontal length-wise with gravity pulling them down (e.g., as they would appear if they are loaded into a container, such as a truck or shipping container). Once the pipes are in this arrangement, radial gaps 164 are identified. The radial gaps 164 are arranged along a radial line 162 that travels vertically through the center point of the pipes.

The radial gaps 164 represent spaces within the pipes that can be used to insert additional pipes. For example, as depicted at 180, pipe 166 has been inserted into one of the radial gaps and pipes 168 have been inserted into another one of the radial gaps.

In some implementations, determining the radial telescopic arrangement for a collection of hollow circular pipes is performed using a radial telescopic arrangement algorithm that is similar to the concentric telescopic arrangement algorithm described above. In some implementations, the following operations are performed for the radial telescopic arrangement algorithm.
1. The radial gaps for concentric telescopically arranged groups (generated from the above concentric telescopic arrangement algorithm) are calculated.
2. The radial gaps are filled with groups with smaller external radius iteratively until no further arrangement is possible in essentially the same manner as the above concentric telescopic arrangement algorithm.

The radial telescopic arrangement generated by the radial telescopic arrangement algorithm is optimal because no further radial groupings can be created.

The below example illustrates creation of an optimal telescopic arrangement using the concentric telescopic arrangement algorithm and the radial telescopic arrangement algorithm. Table 1 depicts an example collection of hollow circular pipes that are part of an order (e.g., a dealer or customer that is placing an order for hollow circular pipes to be delivered). For example, the collection of hollow circular pipes can be created using a service (e.g., an online shopping site) where the dealer or customer places hollow circular pipes into an online shopping cart.

TABLE 1

Collection of Hollow Circular Pipes

| Product ID | Type | External Radius | Internal Radius | Length | Weight | Quantity |
|---|---|---|---|---|---|---|
| E | Pipe | 25.0 | 21.3 | 6 | 7.380 | 1600 |
| D | Pipe | 20.0 | 16.4 | 6 | 5.802 | 1500 |

TABLE 1-continued

Collection of Hollow Circular Pipes

| Product ID | Type | External Radius | Internal Radius | Length | Weight | Quantity |
|---|---|---|---|---|---|---|
| C | Pipe | 16.0 | 12.6 | 6 | 4.998 | 1000 |
| B | Pipe | 12.5 | 9.6 | 6 | 3.402 | 700 |
| F | Pipe | 10.0 | 8.9 | 6 | 2.400 | 1600 |

As depicted in Table 1, the collection of hollow circular pipes includes five specific pipe products. Each pipe product has its own unique properties (e.g., composition, dimensions, price, etc.) and is identified by a product identifier (e.g., a unique product number, a unique material code, or other type of unique identifier). In Table 1, the product identifiers for the five types of pipe are identified by the letters E, D, C, B, and F, for ease of discussion. Each pipe product has a type, which in Table 1 is "pipe." As discussed elsewhere, types other than "pipe" can be used (e.g., a pre-configured bundle of pipes, which can be labeled as a "bundle" and treated as a single unit). Each pipe is also defined by its external and internal radius (e.g., in centimeters, inches, or another unit of measure), length (e.g., in meters or another unit of measure), weight (e.g., in kilograms per meter or some other unit of measure), and quantity.

The following Tables 2-7 illustrate how the concentric telescopic arrangement is determined from the collection of hollow circular pipes of Table 1 using the concentric telescopic arrangement algorithm discussed above. Table 2 depicts the results after a first iteration of the algorithm. Specifically, the first iteration identifies pipe E as the pipe with the largest internal radius (an internal radius of 21.3). The first iteration then identifies pipe D as the pipe with the largest external radius (an external radius of 20.0) that will fit inside pipe E. The first iteration then creates a group of pipes E and pipes D, which is defined using a bracket notation as [E, D]. The notation [E, D] means that pipe D is inserted into pipe E. The quantity of the group [E, D] is 1,500 (i.e., 1500 groups, with each group having one pipe D and one pipe E). The properties of the group [E, D] are listed in Table 2. Specifically, the group [E, D] has an external radius of 25.0 (the external radius of pipe E), an internal radius of 16.4 (the internal radius of pipe D), a length of 6 (pipes E and D have the same length, so the arrangement has the same length), and a weight of 13.182 (the combined weight of one pipe E and one pipe D). After the 1,500 groups are created, there is a 100 quantity of pipe E remaining. Because the algorithm works with groups, the pipes are listed in Table 2 using the group notation (e.g., [E] is a group having just a single pipe E).

TABLE 2

First Iteration - Concentric Telescopic Arrangement

| Group ID | Type | External Radius | Internal Radius | Length | Weight | Quantity |
|---|---|---|---|---|---|---|
| [E, D] | Pipe | 25.0 | 16.4 | 6 | 13.182 | 1500 |
| [E] | Pipe | 25.0 | 21.3 | 6 | 7.380 | 100 |
| [C] | Pipe | 16.0 | 12.6 | 6 | 4.998 | 1000 |
| [B] | Pipe | 12.5 | 9.6 | 6 | 3.402 | 700 |
| [F] | Pipe | 10.0 | 8.9 | 6 | 2.400 | 1600 |

Table 3 depicts the results after a second iteration of the algorithm. Specifically, the second iteration identifies the group [E, D] as having the most members (two members, versus the other groups which only have one member each). In this way, members will be added to group [E, D] during each iteration until no more can be added (in other words, group [E, D] will be increased as much as possible before moving on to the next group). Group [C] (which is just pipe C) is identified as having the largest external radius that will fit within the group [E, D]. This results in the creation of group [E, D, C] with a quantity of 1,000. There is a quantity of 500 remaining of group [E, D] because there were only 1,000 of [C].

TABLE 3

Second Iteration - Concentric Telescopic Arrangement

| Group ID | Type | External Radius | Internal Radius | Length | Weight | Quantity |
|---|---|---|---|---|---|---|
| [E, D, C] | Pipe | 25.0 | 12.6 | 6 | 18.180 | 1000 |
| [E] | Pipe | 25.0 | 21.3 | 6 | 7.380 | 100 |
| [E, D] | Pipe | 25.0 | 16.4 | 6 | 13.182 | 500 |
| [B] | Pipe | 12.5 | 9.6 | 6 | 3.402 | 700 |
| [F] | Pipe | 10.0 | 8.9 | 6 | 2.400 | 1600 |

Table 4 depicts the results after a third iteration of the algorithm. Specifically, the third iteration identifies the group [E, D, C] as having the most members. Group [B] (which is just pipe B) is identified as having the largest external radius that will fit within the group [E, D, C]. This results in the creation of group [E, D, C, B] with a quantity of 700. There is a quantity of 300 remaining of group [E, D, C] because there were only 700 of [B].

TABLE 4

Third Iteration - Concentric Telescopic Arrangement

| Group ID | Type | External Radius | Internal Radius | Length | Weight | Quantity |
|---|---|---|---|---|---|---|
| [E, D, C, B] | Pipe | 25.0 | 9.6 | 6 | 21.582 | 700 |
| [E, D] | Pipe | 25.0 | 16.4 | 6 | 13.182 | 500 |
| [E] | Pipe | 25.0 | 21.3 | 6 | 7.380 | 100 |
| [E, D, C] | Pipe | 25.0 | 12.6 | 6 | 18.180 | 300 |
| [F] | Pipe | 10.0 | 8.9 | 6 | 2.400 | 1600 |

Table 5 depicts the results after a fourth iteration of the algorithm. In the fourth iteration, group [E, D, C, B] is considered first (it has the most members), but the internal radius is 9.6 and there are no other groups with an external radius that will fit (e.g., less than or equal to 9.6), the group with the next largest number of members is considered, which is group [E, D, C]. As a result, the fourth iteration adds group [F] to group [E, D, C] to create 300 of group [E, D, C, F]. This reduces the quantity of group [F] to 1300.

TABLE 5

Fourth Iteration - Concentric Telescopic Arrangement

| Group ID | Type | External Radius | Internal Radius | Length | Weight | Quantity |
|---|---|---|---|---|---|---|
| [E, D, C, B] | Pipe | 25.0 | 9.6 | 6 | 21.582 | 700 |
| [E, D, C, F] | Pipe | 25.0 | 8.9 | 6 | 20.580 | 300 |
| [E, D] | Pipe | 25.0 | 16.4 | 6 | 13.182 | 500 |
| [E] | Pipe | 25.0 | 21.3 | 6 | 7.380 | 100 |
| [F] | Pipe | 10.0 | 8.9 | 6 | 2.400 | 1300 |

Table 6 depicts the results after a fifth iteration of the algorithm. In the fifth iteration, groups [E, D, C, B] and [E, D, C, F] are considered first, but no other groups will fit. So the group with the next largest number of members is considered, which is group [E, D]. As a result, the fifth iteration adds quantity 500 of group [F] to group [E, D] to create quantity 500 of group [E, D, F]. This reduces the quantity of group [F] to 800.

TABLE 6

Fifth Iteration - Concentric Telescopic Arrangement

| Group ID | Type | External Radius | Internal Radius | Length | Weight | Quantity |
|---|---|---|---|---|---|---|
| [E, D, C, B] | Pipe | 25.0 | 9.6 | 6 | 21.582 | 700 |
| [E, D, C, F] | Pipe | 25.0 | 8.9 | 6 | 20.580 | 300 |
| [E, D, F] | Pipe | 25.0 | 8.9 | 6 | 15.582 | 500 |
| [E] | Pipe | 25.0 | 21.3 | 6 | 7.380 | 100 |
| [F] | Pipe | 10.0 | 8.9 | 6 | 2.400 | 800 |

Table 7 depicts the results after a sixth iteration of the algorithm. Groups [E, D, C, B], [E, D, C, F], and [E, D, F] are not candidates due to their internal radius. Therefore, the group with the next largest number of members (either group [E] or group [F]) and that has the largest internal radius is selected, which is group [E]. As a result, the sixth iteration adds quantity 100 of group [F] to group [E] to create quantity 100 of group [E, F]. This reduces the quantity of group [F] to 700.

TABLE 7

Sixth Iteration - Concentric Telescopic Arrangement

| Group ID | Type | External Radius | Internal Radius | Length | Weight | Quantity |
|---|---|---|---|---|---|---|
| [E, D, C, B] | Pipe | 25.0 | 9.6 | 6 | 21.582 | 700 |
| [E, D, C, F] | Pipe | 25.0 | 8.9 | 6 | 20.580 | 300 |
| [E, D, F] | Pipe | 25.0 | 8.9 | 6 | 15.582 | 500 |
| [E, F] | Pipe | 25.0 | 8.9 | 6 | 9.780 | 100 |
| [F] | Pipe | 10.0 | 8.9 | 6 | 2.400 | 700 |

At this point, the concentric telescopic arrangement is complete, and Table 7 reflects the concentric telescopically arranged groups. The concentric telescopic arrangement is optimal because larger groups cannot be created. As illustrated by Table 7, there is no group with an internal radius that would accept the external radius of another group.

Continuing with the example, the radial telescopic arrangement is now determined based on the concentric telescopic arrangement from Table 7. Table 8 depicts the results after performing the radial telescopic arrangement. Specifically, for the group [E, F] from Table 7, a radial gap of 22.6 is calculated (the difference between the internal diameter of 42.6 for pipe E and the external diameter of 20.0 for pipe F). The only group from Table 7 that will fit within this radial gap is group [F] that has an external radius of 10.0 (which equals a diameter of 20.0, which fits within the radial gap of 22.6). Therefore, in Table 8, a quantity of 100 of group [F] has been inserted into the radial gap of group [E, F], which creates the group [E, F, [F]]. The notation for a radial arrangement is a nested bracketed group. In this example, pipes E and F are arranged concentrically, and pipe F is arranged radially between E and F. After the radial arrangement, quantity 600 of group [F] remains.

TABLE 8

First Iteration - Radial Telescopic Arrangement

| Group ID | Type | External Radius | Length | Weight | Quantity |
|---|---|---|---|---|---|
| [E, D, C, B] | Pipe | 25.0 | 6 | 21.582 | 700 |
| [E, D, C, F] | Pipe | 25.0 | 6 | 20.580 | 300 |
| [E, D, F] | Pipe | 25.0 | 6 | 15.582 | 500 |
| [E, F, [F]] | Pipe | 25.0 | 6 | 12.180 | 100 |
| [F] | Pipe | 10.0 | 6 | 2.400 | 600 |

There are no other radial gaps that a large enough space to fit one of the other groups, so at this point the radial arrangement is complete and optimal. Therefore, the result of Table 8 is an optimal telescopic arrangement.

In some implementations, a type other than "pipe" can be used. For example, a "bundle" type can be used that indicates a pre-configured bundle of small pipes (e.g., a collection of small radius pipes that are already grouped together). A bundle can be included in a pipe order, but treated separately. In some implementations, a bundle has properties similar to other pipes, including a product ID, a type, an external radius (representing the overall radius of the bundle), a length (representing the overall length of the bundle), a weight (representing the overall weight of the bundle), and a quantity, but with an internal radius of 0 (zero). The internal radius of zero indicates that no other pipes can be inserted into the bundle, and therefore the bundle will not be available for creating groups as part of the telescopic arrangement process. However, bundles can be included when determining the stacking arrangement.

In some implementations, the telescopic arrangement technologies are applied to pipes that have the same length, which is also referred to as a two-dimensional arrangement. However, the technologies can also be applied to pipes that have different lengths, which is also referred to as a three-dimensional arrangement. For example, the telescopic arrangement can be performed (e.g., independently), and an optimal telescopic arrangement can be output, for each pipe length (e.g., a first optimal telescopic arrangement for all the pipes of a first length, a second optimal telescopic arrangement for all the pipes of a second length, and so on). As another example, two or more pipes (e.g., of relatively short length) can be combined and treated as a single pipe with a length equal to the sum of the two or more pipes.

Stacking Arrangements

In the technologies described herein, hollow circular pipes in telescopically arranged groups can be stacked for shipment within a container according to a stacking arrangement. The stacking arrangement specifies where the groups (generated from the concentric telescopic arrangement and the radial telescopic arrangement processes) will be loaded within the container.

In some implementations, determining the stacking arrangement for groups of telescopically arranged hollow circular pipes is performed using the following algorithm.
1. The weight of each group is calculated.
2. Groups are loaded starting with the heaviest group (from left to right and bottom to top, as viewed from the loading end of the container).
3. The two-dimensional area of the group (from the end of the group, and not considering the length) is treated as a square with width and height equal to the diameter of the group.
4. Stacking is done on a row-by-row basis with the height of a given row being equal to the first group in the row.
5. Row-wise stacking is performed iteratively until all groups have been stacked or the height of the container is reached. However, the empty spaces within each row (e.g., at the endo of a given row) are first considered for filling in with smaller groups during the row stacking.

Space and Weight

In the technologies described herein, the amount of space in a container that is taken up by a telescopic arrangement of pipes can be calculated. In some implementations, the space that is utilized is calculated by comparing the height of the rows in the stacking arrangement to the height of the container.

In the technologies described herein, the utilized weight of a telescopic arrangement of pipes can be calculated. For example, the weight of the groups of the telescopic arrangement can be totaled. The total weight of the groups can be compared to a maximum weight capacity of the container.

Environment for Automated Determination of Loading Arrangements for Hollow Circular Pipes FIG. 2 is a diagram depicting an example environment 200 for automated determination of loading arrangements for hollow circular pipes. The example environment 200 includes a client system 210. The client system 210 (e.g., comprising server resources, database resources, storage resources, software resources, etc.) is involved with ordering hollow circular pipes for delivery via a container (e.g., a truck or another type of container in which hollow circular pipes are shipped or delivered). For example, the client system 210 can be operated by a customer or dealer that is ordering hollow circular pipes for delivery. While one client system 210 is depicted for ease of illustration, the example environment 200 supports multiple client systems.

The example environment 200 also includes a loading simulation service 220. The loading simulation service 220 can be implemented by a variety of server resources, database resources, storage resources, software resources, and/or other types of computing resources. The loading simulation service 220 provides services to the client system 210 for the automated determination of loading arrangements for hollow circular pipes. For example the client system 210 can connect to the loading simulation service 220 via a network, such as the Internet. In addition, the loading simulation service 220 can support multiple clients (including client 210), and the clients can be from different organizations. For example, the loading simulation service 220 can operate as a cloud service serving clients in multiple locations. In some implementations, the loading simulation service 220 is part of an enterprise resource planning (ERP) system.

The client system 210 accesses the loading simulation service 220 to determine loading arrangements for orders of hollow circular pipes. Specifically, as depicted at 230, the client system 210 provides order data for an order of hollow circular pipes. For example, a user of the client system 210 can use a computer user interface (e.g., a graphical user interface) to select a number of hollow circular pipes (e.g., select the pipes by unique product identifier and quantity) for an order (e.g., as part of an online shopping cart). Once the user of the client system 210 has created the order, the client can initiate a process to determine a loading arrangement for the order.

The loading simulation service 220 determines a loading arrangement (e.g., simulating the optimal arrangement of pipes for a given container) and provides the loading arrangement to the client system. For example, at 222 the loading simulation service 220 receives the order for hollow circular pipes from the client system 210 (e.g., entered by the user via a user interface). At 224, an optimal telescopic arrangement is determined for the order. At 226, the loading arrangement is determined. At 228, results of the loading arrangement are output. For example, an indication of the loading arrangement can be displayed to the user (e.g., as depicted at 235) of the client system 210 in a graphical user interface (e.g., displaying space utilized, weight utilized, telescopic arrangement details, stacking arrangement details, container dimensions, and/or other information from the loading arrangement).

Figure 3:
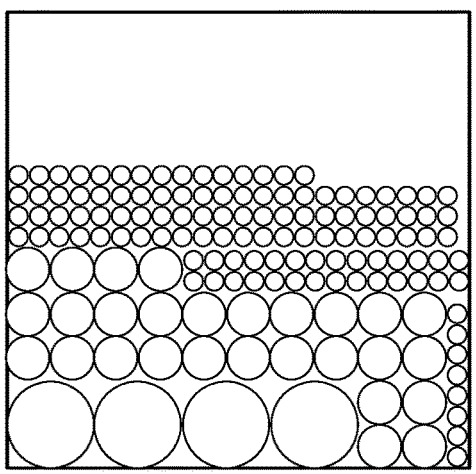
FIG. 3 is a diagram depicting an example user interface for determining a loading arrangement for hollow circular pipes.

FIG. 3 is a diagram depicting an example user interface 300 for determining a loading arrangement for hollow circular pipes. For example, the example user interface 300 can be generated by a computer service, such as the loading simulation service 220, and displayed to a user of a client system, such as client system 210, for use by a user of the client system.

For example, a user can use the example user interface 300 when placing an order for hollow circular pipes. As depicted at 310, the user can order quantities of various pipe products. Once the user has entered the order, the user can initiate a process to determine the loading arrangement. For example, the user could select a user interface element (e.g., a "submit" button or a "simulate" button) to submit the order for determining the loading arrangement.

In this example, the loading arrangement has been determined, and the container utilization 320 results are displayed in the example user interface 300. The container utilization 320 results indicate that the container (e.g., the truck) is 79.3% full (which depends on the stacking arrangement) and the weight utilized is 19,386 lbs. (with the maximum weight of the container being 20,000 lbs.) based on the determined telescopic arrangement and stacking arrangement for the order. Other indications of space and/or weight can be displayed as well. For example, an alert can be displayed if the order would not fit in the container or would exceed the maximum weight of the container.

Based on the results, the user can adjust the order. For example, if the space utilized and weight utilized are below the maximum capacity of the container, the user can add more pipe products (e.g., add new pipe products to the order and/or increase the quantity of existing pipe products in the order). The user can then re-run the loading arrangement process and view updated container utilization 320 results in real-time. The user can perform this procedure any number of times until the desired results are achieved (e.g., until the space and/or weight utilized are at or near the capacity of the container).

In some implementations, the example user interface 300 includes additional detail. For example, the example user interface 300 can include an indication of the telescopic arrangement of groups 330. The telescopic arrangement of groups 330 can indicate which of the hollow circular pipes will be arranged within each other concentrically and/or which of the hollow circular pipes will be arranged within each other radially.

The example user interface 300 can also display a stacking arrangement 340. The stacking arrangement 340 depicts how the groups of the telescopic arrangement are stacked within the container. The stacking arrangement 340 is for illustrative purposes only, and does not reflect the example groups and quantities of the telescopic arrangement of groups 330.

The stacking arrangement 340 also illustrates how the stacking algorithm discussed above operates. Specifically, as depicted in the stacking arrangement 340, the heaviest group (in typical scenarios, the largest diameter group is also the heaviest) is loaded first from left to right (the four largest circles). The next heaviest group is then stacked to complete the first row and for about two and a half more rows. Finally, the least heavy group is stacked to fill in the remaining rows. In addition, the empty space at the right is filled in with the least heavy (and smallest diameter) group. Once the stacking arrangement 340 is complete, the utilized space of the container can be calculated (e.g., by comparing the height of the rows with the interior height of the container).

In some implementations, the telescopic arrangement of groups 330 and the loading arrangement 340 are provided to the shipper (e.g., to the person or entity responsible for arranging the pipes into groups and loading the groups into the container for shipment).

Methods for Automated Determination of Loading Arrangements for Hollow Circular Pipes In the technologies described herein, methods can be provided for automated determination of loading arrangements (comprising optimal telescopic arrangements) for hollow circular pipes.

Figure 4:
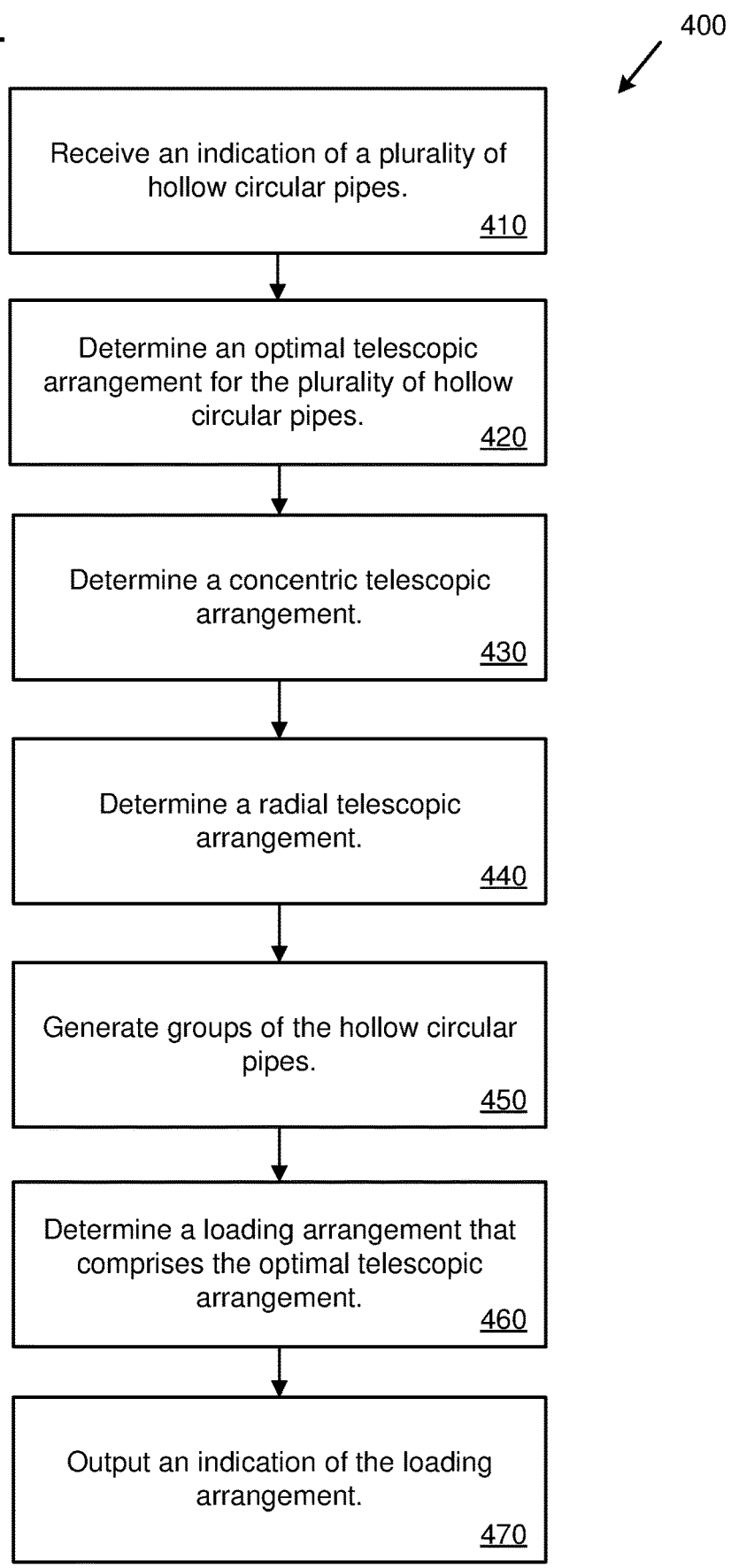
FIG. 4 is a is a flowchart of an example method for automated determination of loading arrangements.

FIG. 4 is a flowchart depicting an example process 400 for automated determination of loading arrangements. At 410, an indication of a plurality of hollow circular pipes is received. For example, the indication of the plurality of hollow circular pipes can be received as part of an order for pipe products (e.g., form a user placing an online order via a computer user interface). The plurality of hollow circular pipes can be identified by their unique product identifiers and be associated with a quantity. Each unique pipe product can have associated properties (e.g., type, internal and external radius, weight, length, composition, etc.).

At 420, an optimal telescopic arrangement is determined for the plurality of hollow circular pipes. Determining the optimal telescopic arrangement involves determining a concentric telescopic arrangement, as indicated at 430. Determining the optimal telescopic arrangement also involves determining a radial telescopic arrangement, as indicated at 440. Finally, at 450, groups of the hollow circular pipes are generated according to the concentric telescopic arrangement and the radial telescopic arrangement. The groups specify which of the hollow circular pipes will be arranged within each other concentrically and which of the hollow circular pipes will be arranged within each other radially. In this way, the groups define the optimal telescopic arrangement. For example, the groups can be provided using the notation depicted in Table 8.

At 460, the loading arrangement is determined. The loading arrangement comprises the optimal telescopic arrangement (e.g., comprises an indication of the groups). In general, the loading arrangement comprises information related to loading of the groups of the hollow circular pipes (e.g., the groups themselves, space and weight information, stacking arrangement, and/or other information).

At 470, an indication of the loading arrangement is output. For example, the groups can be sent to a manufacturer or warehouse for loading onto a truck for delivery. Information about a pipe order can also be sent to a user so that the user can view (e.g., in a computer user interface) the pipes in the order, the telescopic arrangement of the pipes (e.g., in a text format and/or in a graphical representation), space and weight information for the container (e.g., how much of the space and weight capacity of the truck is being utilized), and/or stacking arrangement information. The user can edit the plurality of hollow circular pipes (e.g., add or delete pipes from the order and/or adjust quantities) and re-run the method to update the loading arrangement.

Figure 5:
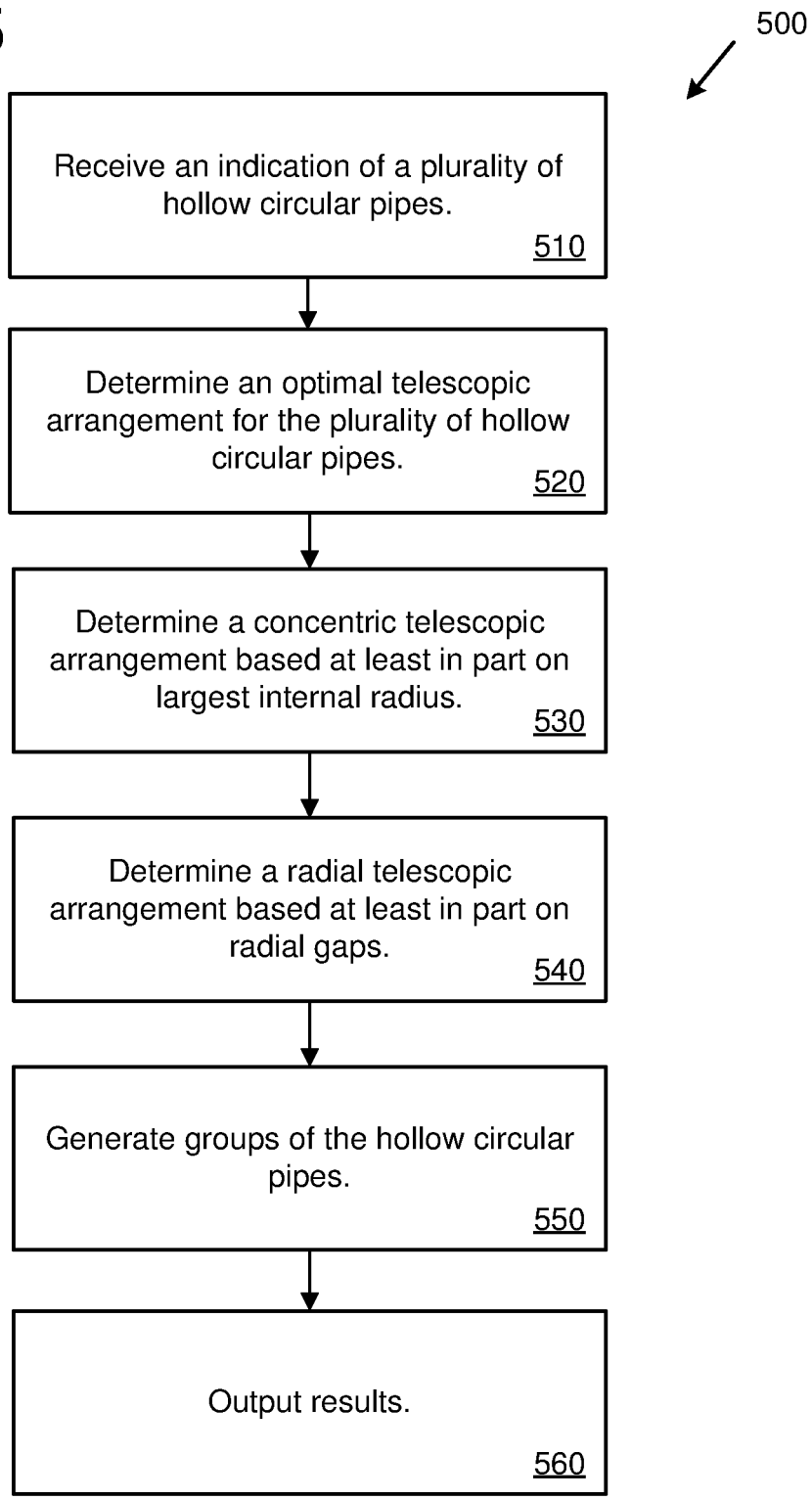
FIG. 5 is a is a flowchart of an example method for automated determination of optimal telescopic arrangements.

FIG. 5 is a flowchart depicting an example process 500 for automated determination of an optimal telescopic arrangement (e.g., as part of a loading arrangement). At 510, an indication of a plurality of hollow circular pipes is received. For example, the indication of the plurality of hollow circular pipes can be received as part of an order for pipe products (e.g., form a user placing an online order via a computer user interface). The plurality of hollow circular pipes can be identified by their unique product identifiers and be associated with a quantity. Each unique pipe product can have associated properties (e.g., type, internal and external radius, weight, length, composition, etc.).

At 520, an optimal telescopic arrangement is determined for the plurality of hollow circular pipes. Determining the optimal telescopic arrangement involves determining a concentric telescopic arrangement, as indicated at 530. The concentric telescopic arrangement includes arranging pipes within pipes concentrically based at least in part on largest internal radius (e.g., by first selecting the pipe with the largest internal radius and inserting the pipe with the largest external radius that will fit). Determining the optimal telescopic arrangement also involves determining a radial telescopic arrangement, as indicated at 540. The radial telescopic arrangement is determined based at least in part on radial gaps within the concentric telescopic arrangement. Finally, at 550, groups of the hollow circular pipes are generated according to the concentric telescopic arrangement and the radial telescopic arrangement. The groups specify which of the hollow circular pipes will be arranged within each other concentrically and which of the hollow circular pipes will be arranged within each other radially. In this way, the groups define the optimal telescopic arrangement. For example, the groups can be provided using the notation depicted in Table 8.

At 560, results of loading the container according to the optimal telescopic arrangement are output. For example, the results can comprise some or all of the information depicted in FIG. 3. The results can be output for display in a computer user interface (e.g., a graphical user interface) to a user (e.g., to the user placing the order, to a manufacturer or warehouse that is shipping the order, and/or to another entity). The user can edit the plurality of hollow circular pipes (e.g., add or delete pipes from the order and/or adjust quantities) and re-run the method to receive updated results.

Computing Systems

Figure 6:
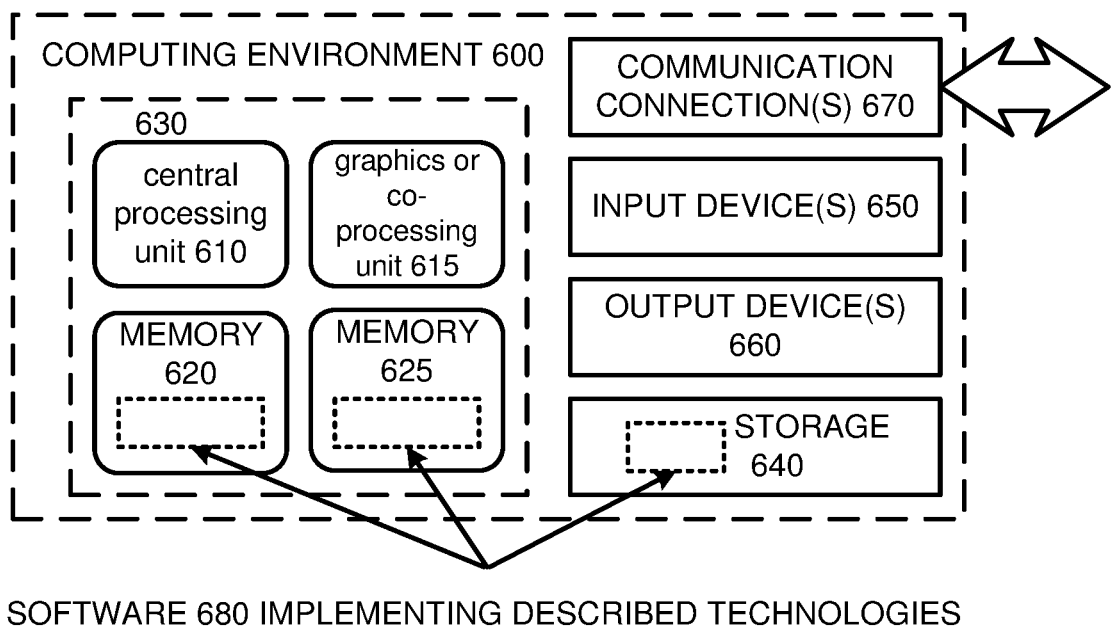
FIG. 6 is a diagram of an example computing system in which some described embodiments can be implemented.

FIG. 6 depicts a generalized example of a suitable computing system 600 in which the described innovations may be implemented. The computing system 600 is not intended to suggest any limitation as to scope of use or functionality, as the innovations may be implemented in diverse general-purpose or special-purpose computing systems.

With reference to FIG. 6, the computing system 600 includes one or more processing units 610, 615 and memory 620, 625. In FIG. 6, this basic configuration 630 is included within a dashed line. The processing units 610, 615 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 6 shows a central processing unit 610 as well as a graphics processing unit or co-processing unit 615. The tangible memory 620, 625 may be volatile memory (e.g., registers, cache, RAM), non-volatile memory (e.g., ROM, EEPROM, flash memory, etc.), or some combination of the two, accessible by the processing unit(s). The memory 620, 625 stores software 680 implementing one or more innovations described herein, in the form of computer-executable instructions suitable for execution by the processing unit(s).

A computing system may have additional features. For example, the computing system 600 includes storage 640, one or more input devices 650, one or more output devices 660, and one or more communication connections 670. An interconnection mechanism (not shown) such as a bus, controller, or network interconnects the components of the computing system 600. Typically, operating system software (not shown) provides an operating environment for other software executing in the computing system 600, and coordinates activities of the components of the computing system 600.

The tangible storage 640 may be removable or non-removable, and includes magnetic disks, magnetic tapes or cassettes, CD-ROMs, DVDs, or any other medium which can be used to store information in a non-transitory way and which can be accessed within the computing system 600. The storage 640 stores instructions for the software 680 implementing one or more innovations described herein.

The input device(s) 650 may be a touch input device such as a keyboard, mouse, pen, or trackball, a voice input device, a scanning device, or another device that provides input to the computing system 600. For video encoding, the input device(s) 650 may be a camera, video card, TV tuner card, or similar device that accepts video input in analog or digital form, or a CD-ROM or CD-RW that reads video samples into the computing system 600. The output device(s) 660 may be a display, printer, speaker, CD-writer, or another device that provides output from the computing system 600.

The communication connection(s) 670 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Cloud Computing Environment

Figure 7:
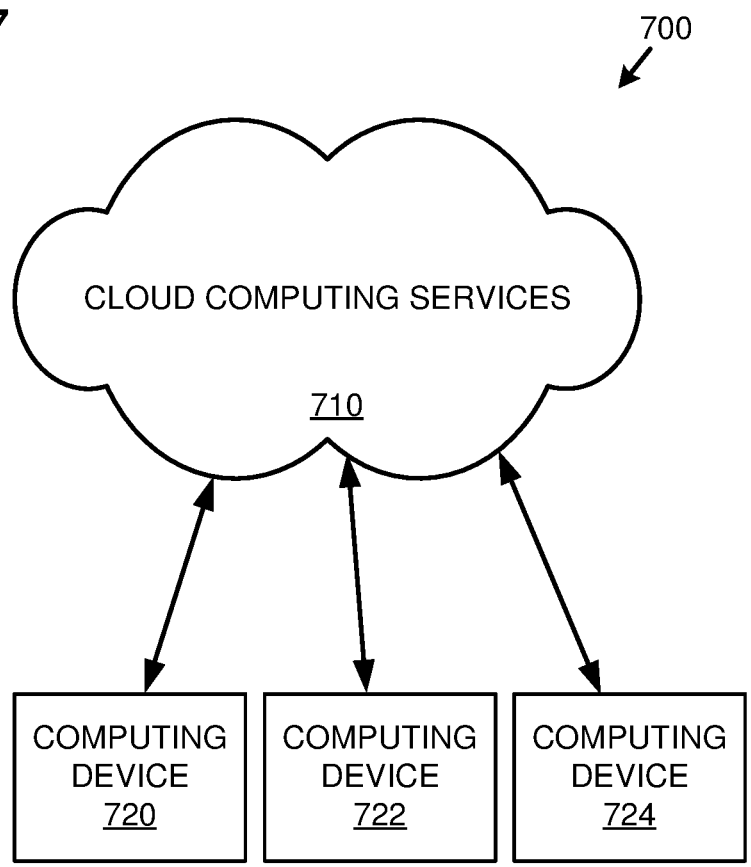
FIG. 7 is an example cloud computing environment that can be used in conjunction with the technologies described herein.

FIG. 7 depicts an example cloud computing environment 700 in which the described technologies can be implemented. The cloud computing environment 700 comprises cloud computing services 710. The cloud computing services 710 can comprise various types of cloud computing resources, such as computer servers, data storage repositories, database resources, networking resources, etc. The cloud computing services 710 can be centrally located (e.g., provided by a data center of a business or organization) or distributed (e.g., provided by various computing resources located at different locations, such as different data centers and/or located in different cities or countries).

The cloud computing services 710 are utilized by various types of computing devices (e.g., client computing devices), such as computing devices 720, 722, and 724. For example, the computing devices (e.g., 720, 722, and 724) can be computers (e.g., desktop or laptop computers), mobile devices (e.g., tablet computers or smart phones), or other types of computing devices. For example, the computing devices (e.g., 720, 722, and 724) can utilize the cloud computing services 710 to perform computing operators (e.g., data processing, data storage, and the like).

Example Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (i.e., any available computing device, including smart phones or other mobile devices that include computing hardware). Computer-readable storage media are tangible media that can be accessed within a computing environment (one or more optical media discs such as DVD or CD, volatile memory (such as DRAM or SRAM), or nonvolatile memory (such as flash memory or hard drives)). By way of example and with reference to FIG. 6, computer-readable storage media include memory 620 and 625, and storage 640. The term computer-readable storage media does not include signals and carrier waves. In addition, the term computer-readable storage media does not include communication connections, such as 670.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A method, performed by one or more computing devices, for automated determination of a loading arrangement of hollow circular pipes, the method comprising:
   receiving an indication of a plurality of hollow circular pipes to be shipped in a container;
   determining an optimal telescopic arrangement for the plurality of hollow circular pipes, wherein determining the optimal telescopic arrangement comprises:
   determining a concentric telescopic arrangement;
   determining a radial telescopic arrangement; and
   generating groups of the hollow circular pipes according to the concentric telescopic arrangement and the radial telescopic arrangement, wherein the groups specify which of the hollow circular pipes will be arranged within each other concentrically and which of the hollow circular pipes will be arranged within each other radially, and wherein the groups define the optimal telescopic arrangement;

determining the loading arrangement for the container, wherein the loading arrangement comprises the optimal telescopic arrangement; and outputting an indication of the loading arrangement.

2. The method of claim 1, wherein the loading arrangement further comprises:

indications of space and/or weight capacity when the groups of hollow circular pipes in the optimal telescopic arrangement are loaded into the container.

3. The method of claim 1, further comprising:

calculating an indication of how much space of the container is occupied by the groups of hollow circular pipes in the optimal telescopic arrangement;

wherein the optimal loading arrangement comprises the indication of how much space of the container is occupied.

4. The method of claim 1, further comprising:

calculating the weight of the groups of hollow circular pipes;

wherein the loading arrangement comprises an indication of the weight of the groups of hollow circular pipes in relation to a maximum weight capacity of the container.

5. The method of claim 1, further comprising:

determining a stacking arrangement based at least in part on the groups of hollow circular pipes in the optimal telescopic arrangement;

wherein the loading arrangement comprises an indication of the stacking arrangement.

6. The method of claim 1, wherein outputting an indication of the loading arrangement comprises:

outputting, for display in a user interface, an indication of how much space of the container is utilized by the groups of the hollow circular pipes in the optimal telescopic arrangement; and outputting, for display in the user interface, an indication of how much weight is utilized by the groups of the hollow circular pipes in the optimal telescopic arrangement in relation a maximum weight capacity of the container.

7. The method of claim 1, wherein the method is performed as part of a loading simulation in which a user provides the indication of the plurality of hollow circular pipes as an order, the method further comprising:

providing, for display to the user in a graphical user interface, information representing the loading arrangement.

8. The method of claim 7, wherein the graphical user interface visually depicts at least the following aspects of the loading arrangement:

indications of the groups of the hollow circular pipes in the optimal telescopic arrangement; and an indication of a stacking arrangement depicting a location for each group of hollow circular pipes indicating where the group of hollow circular pipes is loaded in the container.

9. The method of claim 7, wherein the graphical user interface visually depicts at least the following aspects of the loading arrangement:

an indication of how much space of the container is utilized by the groups of the hollow circular pipes in the optimal telescopic arrangement; and an indication of how much weight is utilized by the groups of the hollow circular pipes in the optimal telescopic arrangement in relation a maximum weight capacity of the container.

10. The method of claim 7, further comprising:

receiving, from the user, a change to the order of the plurality of hollow circular pipes, wherein the order indicates a new plurality of hollow circular pipes;

determining an optimal telescopic arrangement for the new plurality of hollow circular pipes to generate a new optimal telescopic arrangement;

determining an updated loading arrangement for the container for the new optimal telescopic arrangement; and providing, for display to the user in the graphical user interface, information representing the updated loading arrangement.

11. One or more computing devices comprising:

processors; and memory;

the one or more computing devices configured, via computer-executable instructions, to perform operations, the operations comprising:

receiving an indication of a plurality of hollow circular pipes to be loaded into a container;

determining an optimal telescopic arrangement for the plurality of hollow circular pipes, wherein determining the optimal telescopic arrangement comprises:

determining a concentric telescopic arrangement that includes arranging pipes within pipes concentrically based at least in part on largest internal radius;

determining a radial telescope arrangement using the concentric telescopic arrangement, wherein determining the radial telescopic arrangement is based at least in part on radial gaps within the concentric telescopic arrangement; and generating groups of the hollow circular pipes according to the concentric telescopic arrangement and the radial telescopic arrangement, wherein the groups specify which of the hollow circular pipes will be arranged within each other concentrically and which of the hollow circular pipes will be arranged within each other radially, and wherein the groups define the optimal telescopic arrangement; and outputting results of loading the container according to the optimal telescopic arrangement.

12. The one or more computing devices of claim 11, further comprising:

outputting indications of space and/or weight capacity when the groups of hollow circular pipes in the optimal telescopic arrangement are loaded into the container.

13. The one or more computing devices of claim 11, further comprising:

calculating how much space of the container is occupied by the groups of hollow circular pipes in the optimal telescopic arrangement; and outputting an indication of how much space of the container is occupied.

14. The one or more computing devices of claim 11, further comprising:

calculating the weight of the groups of hollow circular pipes; and outputting an indication of the weight of the groups of hollow circular pipes in relation to a maximum weight capacity of the container.

15. The one or more computing devices of claim 11, the operations further comprising:
   determining a stacking arrangement based at least in part on the groups of hollow circular pipes in the optimal telescopic arrangement; and
   outputting an indication of the stacking arrangement.

16. The one or more computing devices of claim 11, wherein the operations are performed as part of a loading simulation in which the indication of the plurality of hollow circular pipes is provided as an order, and wherein the results of loading the container according to the optimal telescopic arrangement are provided for display in a graphical user interface.

17. The one or more computing devices of claim 11, wherein outputting results of loading the container according to the optimal telescopic arrangement comprises:
   indications of the groups of the hollow circular pipes in the optimal telescopic arrangement; and
   an indication of a stacking arrangement depicting a location for each group of hollow circular pipes indicating where the group of hollow circular pipes is loaded in the container.

18. The one or more computing devices of claim 11, wherein outputting results of loading the container according to the optimal telescopic arrangement comprises:
   outputting, for display in a user interface, an indication of how much space of the container is utilized by the groups of the hollow circular pipes in the optimal telescopic arrangement; and
   outputting, for display in the user interface, an indication of how much weight is utilized by the groups of the hollow circular pipes in the optimal telescopic arrangement in relation a maximum weight capacity of the container.

19. The one or more computing devices of claim 11, wherein determining the concentric telescopic arrangement comprises:
   generating concentric telescopically arranged groups based on the concentric telescopic arrangement, wherein at least one of the concentric telescopically arranged groups arranges two or more of the plurality of hollow circular pipes.

20. One or more computer-readable storage media storing computer-executable instructions for execution on one or more computing devices to perform operations, the operations comprising:
   receiving an indication of a plurality of hollow circular pipes to be loaded into a container;
   determining an optimal telescopic arrangement for the plurality of hollow circular pipes, wherein determining the optimal telescopic arrangement comprises:
      determining a concentric telescopic arrangement that includes arranging pipes within pipes concentrically based at least in part on largest internal radius;
      determining a radial telescope arrangement using the concentric telescopic arrangement, wherein determining the radial telescopic arrangement is based at least in part on radial gaps within the concentric telescopic arrangement; and
      generating groups of the hollow circular pipes according to the concentric telescopic arrangement and the radial telescopic arrangement, wherein the groups specify which of the hollow circular pipes will be arranged within each other concentrically and which of the hollow circular pipes will be arranged within each other radially, and wherein the groups define the optimal telescopic arrangement; and
   outputting results of loading the container according to the optimal telescopic arrangement.

\* \* \* \* \*